(12) United States Patent
Hoschouer et al.

(10) Patent No.: US 11,541,710 B2
(45) Date of Patent: Jan. 3, 2023

(54) VEHICLE SUSPENSION COMPONENT WITH STRENGTHENING FEATURE AND CONNECTION NODE

(71) Applicant: GROUPER STAMPING, LLC, Lexington, KY (US)

(72) Inventors: Clifford Hoschouer, Medina, OH (US); Anthony J. Santamaria, North Ridgeville, OH (US)

(73) Assignee: GROUPER STAMPING, LLC, Lexington, KY (US)

( * ) Notice: Subject to any disclaimer, the term of this patent is extended or adjusted under 35 U.S.C. 154(b) by 0 days.

(21) Appl. No.: 17/268,410

(22) PCT Filed: Jul. 29, 2019

(86) PCT No.: PCT/US2019/043842
§ 371 (c)(1),
(2) Date: Feb. 12, 2021

(87) PCT Pub. No.: WO2020/040941
PCT Pub. Date: Feb. 27, 2020

(65) Prior Publication Data
US 2021/0197637 A1    Jul. 1, 2021

Related U.S. Application Data

(60) Provisional application No. 62/778,547, filed on Dec. 12, 2018, provisional application No. 62/719,771, filed on Aug. 20, 2018.

(51) Int. Cl.
*B60G 7/00* (2006.01)

(52) U.S. Cl.
CPC .............. *B60G 7/001* (2013.01); *B60G 7/005* (2013.01); *B60G 2206/11* (2013.01);
(Continued)

(58) Field of Classification Search
CPC .... B60G 7/001; B60G 7/005; B60G 2206/11; B60G 2206/122; B60G 2206/72;
(Continued)

(56) References Cited

U.S. PATENT DOCUMENTS

| 5,607,177 A | * | 3/1997 | Kato | ...................... | B60G 7/001 |
| | | | | | 280/124.134 |
| 7,938,417 B2 | * | 5/2011 | Ersoy | ..................... | B60G 7/005 |
| | | | | | 280/124.134 |

(Continued)

FOREIGN PATENT DOCUMENTS

| CN | 211567575 U | * | 9/2020 |
| JP | 2010023713 A | | 2/2010 |

(Continued)

OTHER PUBLICATIONS

International Search Report and Written Opinion issued for PCT/US2019/043842 dated Nov. 14, 2019; 11 pages.

(Continued)

*Primary Examiner* — Darlene P Condra
(74) *Attorney, Agent, or Firm* — Reising Ethington, P.C.

(57) ABSTRACT

A vehicle suspension component, such as a lower control arm, that includes first and second stamped metal shells and several connection nodes for operably connecting the suspension component to the rest of the vehicle suspension system. The first and second stamped metal shells may be stamped from next generation steel that is lightweight and strong, and are joined together in a clam shell or box-style type design. Each of the connection nodes includes a fixed attachment end and a movable attachment end, wherein the fixed attachment end may be sandwiched between the shell connection node portions of the first and second stamped metal shells and welded thereto, whereas the movable attachment end movably or pivotably attaches the vehicle suspension component to the vehicle suspension system.

16 Claims, 5 Drawing Sheets

(52) U.S. Cl.
CPC .... *B60G 2206/122* (2013.01); *B60G 2206/72* (2013.01); *B60G 2206/8102* (2013.01); *B60G 2206/8201* (2013.01)

(58) Field of Classification Search
CPC .... B60G 2206/8102; B60G 2206/8201; B60G 2206/012
See application file for complete search history.

(56) References Cited

U.S. PATENT DOCUMENTS

| | | | | |
|---|---|---|---|---|
| 2010/0066050 | A1* | 3/2010 | Miyawaki | B60G 7/02 29/525 |
| 2011/0298192 | A1* | 12/2011 | Yu | B60G 7/001 280/124.134 |
| 2012/0021241 | A1* | 1/2012 | Perry | B60G 3/04 29/428 |
| 2012/0098228 | A1 | 4/2012 | Wilson | |
| 2013/0205591 | A1* | 8/2013 | Santini | B60G 7/001 29/897.2 |
| 2018/0105002 | A1* | 4/2018 | Watanabe | B60G 7/001 |
| 2020/0324599 | A1* | 10/2020 | Frenzel | B60G 7/02 |

FOREIGN PATENT DOCUMENTS

| | | |
|---|---|---|
| KR | 20120002376 A | 1/2012 |
| KR | 101338968 B1 | 12/2013 |
| KR | 20160134898 A | 11/2016 |

OTHER PUBLICATIONS

International Preliminary Report on Patentability issued for PCT/US2019/043842 dated Mar. 4, 2021; 8 pages.

* cited by examiner

VEHICLE SUSPENSION COMPONENT WITH STRENGTHENING FEATURE AND CONNECTION NODE

REFERENCE TO RELATED APPLICATIONS

This application claims the benefit of U.S. Provisional Ser. Nos. 62/719,771 filed on Aug. 20, 2018 and 62/778,547 filed on Dec. 12, 2018, the entire contents of both of which are incorporated herein by reference.

FIELD

The present disclosure relates to a vehicle component and, more specifically, to a vehicle suspension component, such as a control arm, that is made of stamped sheet metal and includes a strengthening feature and a connection node.

BACKGROUND

There are substantial efforts being made in the automotive industry to reduce the weight of the vehicle, which typically results in a corresponding improvement in fuel efficiency, without compromising the component in terms of strength, stiffness, durability, etc. Furthermore, there is strong desire to utilize cost effective manufacturing methods, such as stampings, where possible. The vehicle suspension component and method of the present disclosure are designed to address and balance these and other objectives so that a light weight, sufficiently stiff and cost effective vehicle suspension component can be provided.

SUMMARY

According to one aspect, there is provided a vehicle suspension component, comprising: a first stamped metal shell that includes a shell interior surface, a shell exterior surface, and a shell connection node portion; a second stamped metal shell that includes a shell interior surface, a shell exterior surface, and a shell connection node portion; and a connection node for connecting the vehicle suspension component to a part of a vehicle suspension system, the connection node includes a fixed attachment end and a movable attachment end, wherein the shell connection node portions of the first and second stamped metal shells at least partially surround and are attached to the fixed attachment end of the connection node.

According to various embodiments, the vehicle suspension component may further include any one of the following features or any technically-feasible combination of some or all of these features:

- at least one of the first or second stamped metal shells is made from a next generation steel that has a yield strength, after forming, that is equal to or greater than 780 MPa along a load-bearing path and has an elongation, after forming, that is equal to or greater than 30%;
- the at least one stamped metal shell has an average thickness of between 1.0 mm and 5.0 mm and is made from a next generation steel that is selected from the group consisting of: advanced high-strength steels (AHSS), third generation steels (Gen3 steels), fourth generation steels (Gen4 steels), or press hardenable or hot stamped steels;
- the first and second stamped metal shells are complementary in shape and form a clam-shell or a box-style type design, and a plurality of connection nodes are sandwiched between the first and second stamped metal shells;
- at least one of the first or second stamped metal shells includes a strengthening feature located at or near one of the shell connection node portions, the strengthening feature includes a strengthening indentation, a strengthening protrusion, or both a strengthening indentation and protrusion;
- the strengthening feature includes a strengthening indentation that is a U-shaped trough or channel with an indentation floor located at a bottom of the strengthening indentation, a pair of indentation inner edges that are connected to the indentation floor, a pair of indentation side walls that are connected to and extend from the pair of indentation inner edges, and a pair of indentation outer edges that are connected to the pair of indentation side walls;
- each of the pair of indentation inner edges is a rounded corner and is defined by a radius $R_1$, and each of the pair of indentation outer edges is a rounded corner and is defined by a radius $R_2$;
- the radius $R_1$ is between 1 mm and 10 mm, inclusive, the radius $R_2$ is between 2 mm and 11 mm, inclusive, and the radius $R_2$ is greater than the radius $R_1$ so that the pair of indentation inner edges are tighter than the pair of indentation outer edges;
- the pair of indentation side walls extend from the pair of indentation inner edges and diverge outwardly at an indentation angle $\alpha$ such that a width (W) of the strengthening indentation is greater at the indentation outer edges than at the indentation inner edges;
- a width (W) and a depth (D) of the strengthening feature vary along a length of the strengthening feature such that a first width ($W_1$) of the strengthening feature is smaller than a second width ($W_2$) of the strengthening feature when the first width is at a position closer to the connection node than the second width, and a first depth ($D_1$) of the strengthening feature is smaller than a second depth ($D_2$) of the strengthening feature when the first depth is at a position closer to the connection node than the second depth;
- at least one of the first or second stamped metal shells includes a shell depression that is formed towards the center of the part and includes a depression floor and a depression weld that is at least partially located in the depression floor, wherein the depression weld joins the shell interior surfaces of the first and second stamped metal shells together;
- an interior cavity is formed between the shell interior surfaces of the first and second stamped metal shells, respectively, and the interior cavity is shaped so that the fixed attachment end of the connection node fits within the interior cavity;
- the cross-sectional shape of the fixed attachment end of the connection node tightly corresponds to that of the interior cavity so that the first and second stamped metal shells are welded to the fixed attachment end with a weld;
- the connection node is a ball joint connection node that is a separate piece from the first and second stamped metal shells and is made of a solid metal, the ball joint connection node includes the fixed attachment end for fixed attachment to the first and second stamped metal shells, and a movable attachment end for movable or pivotable attachment within a ball joint assembly of a vehicle suspension system;

the connection node is a bushing joint connection node that is a separate piece from the first and second stamped metal shells and is in the shape of a spindle, the bushing joint connection node includes the fixed attachment end for fixed attachment to the first and second stamped metal shells, and a movable attachment end for movable or rotatable attachment within a bushing joint assembly of a vehicle suspension system;

the fixed attachment end of the bushing joint connection node is flared and is received in an interior cavity formed between the first and second stamped metal shells, and the fixed attachment end is welded to the first and second stamped metal shells with at least one circumferential weld;

the at least one circumferential weld includes first and second circumferential laser welds that are parallel to one another and circumferentially surround the fixed attachment end of the bushing joint connection node;

the first circumferential laser weld is located at an end of the first and second stamped metal shells so as to create a stepped or non-flush junction with a side surface of the bushing joint connection node, and the second circumferential laser weld is located inboard of the first circumferential laser weld at an end of the bushing joint connection node so as to create a stepped or non-flush junction with the interior surfaces of the first and second stamped metal shells, respectively;

the vehicle suspension component is a three-point lower control arm that includes a ball joint connection node for attachment to a ball joint, a first bushing joint connection node for attachment to a first bushing joint, and a second bushing connection node for attachment to a second bushing joint;

According to another aspect, there is provided a method for manufacturing a vehicle suspension component, the method comprising the steps of: stamping a first stamped metal shell that includes a shell interior surface, a shell exterior surface, and a shell connection node portion; stamping a second stamped metal shell that includes a shell interior surface, a shell exterior surface, and a shell connection node portion; providing a connection node for connecting the vehicle suspension component to a part of a vehicle suspension system, the connection node includes a fixed attachment end and a movable attachment end; positioning the shell connection node portions of the first and second stamped metal shells to be at least partially surrounding the fixed attachment end of the connection node; and welding the shell connection node portions of the first and second stamped metal shells to the fixed attachment end of the connection node.

DRAWINGS

Figure 2:
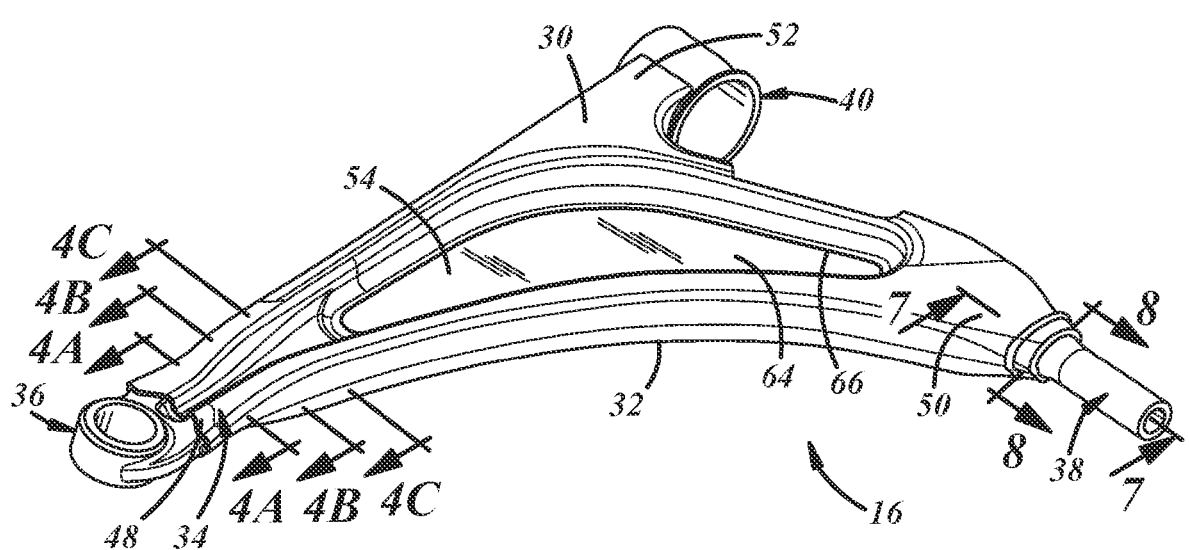
FIG. 2 is a perspective view of the lower control arm of FIG. 1.
Figure 3:
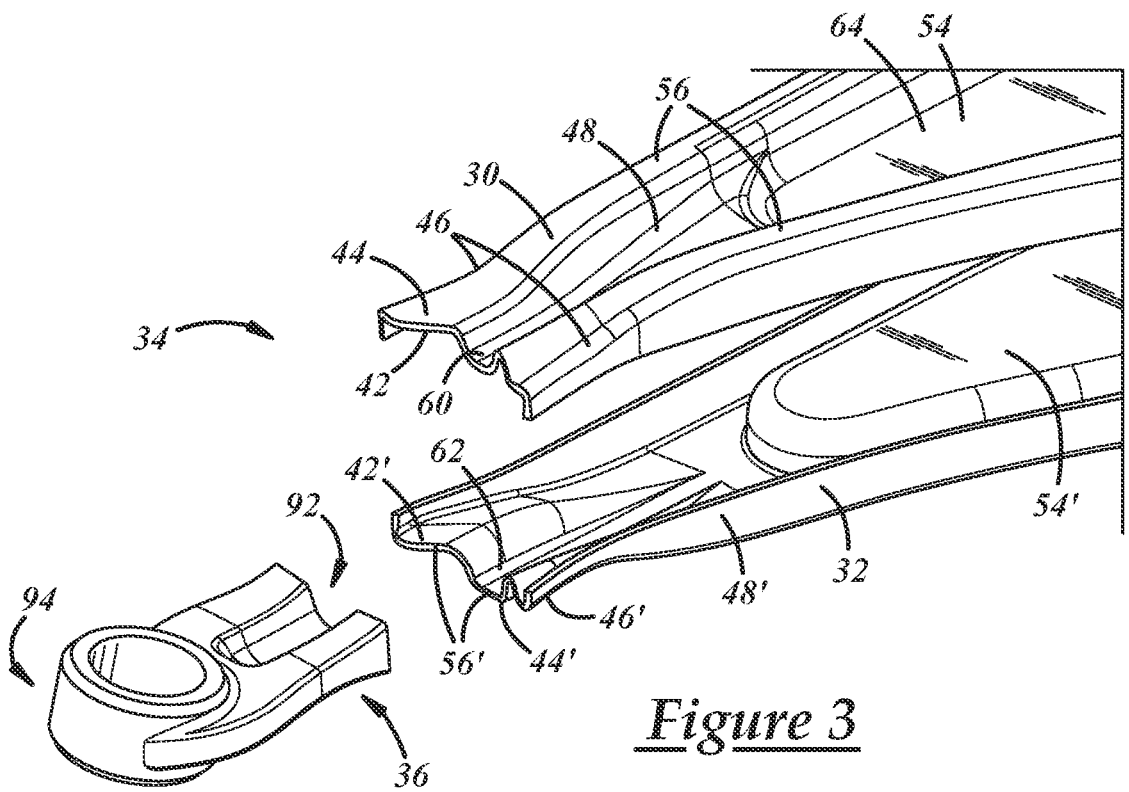
FIG. 3 is an exploded perspective view of the lower control arm of FIG. 2, where the view shows first and second stamped metal shells and a connection node for a ball joint before they are joined together.
Figure 4A:
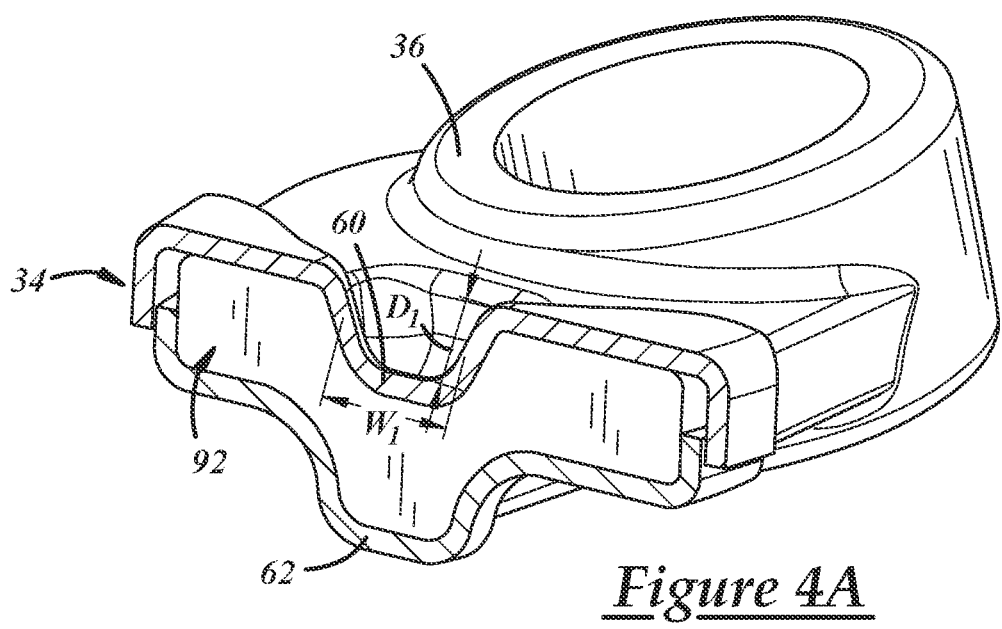
Figure 4B:
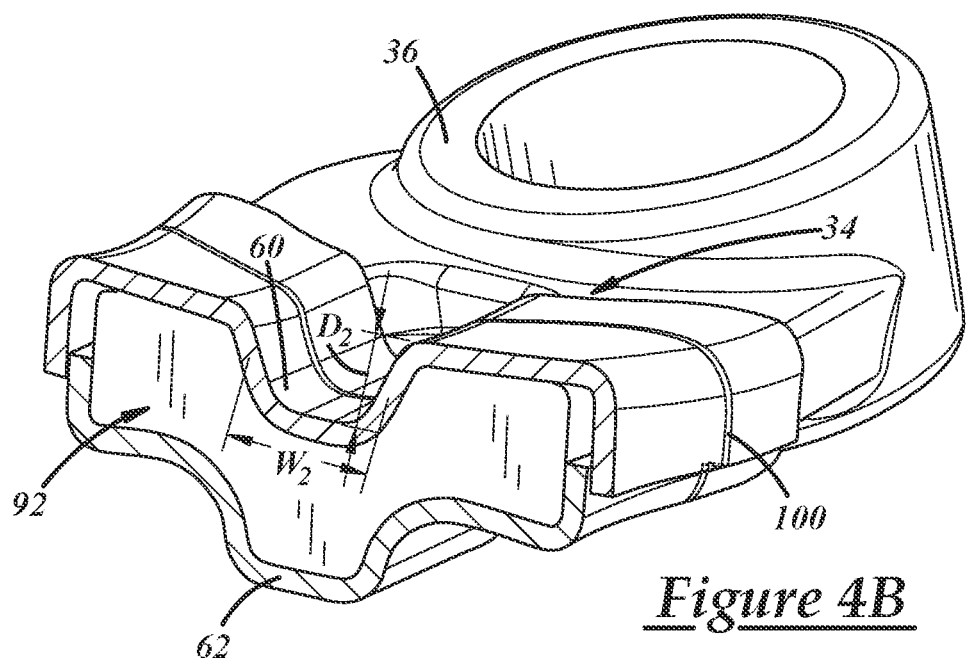
Figure 4C:
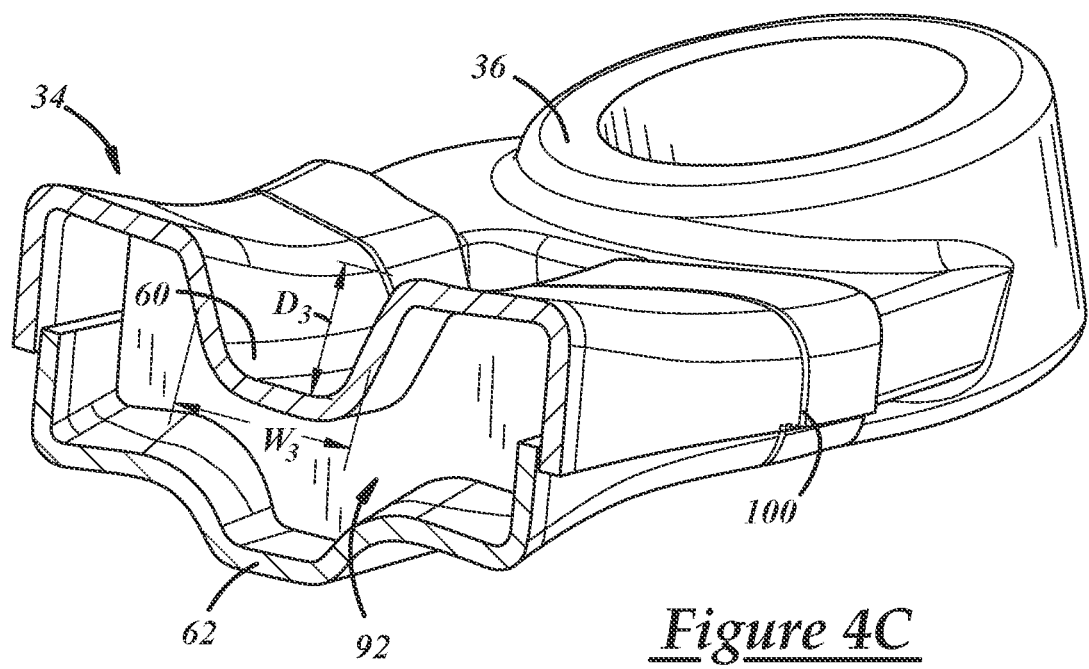
Figure 5:
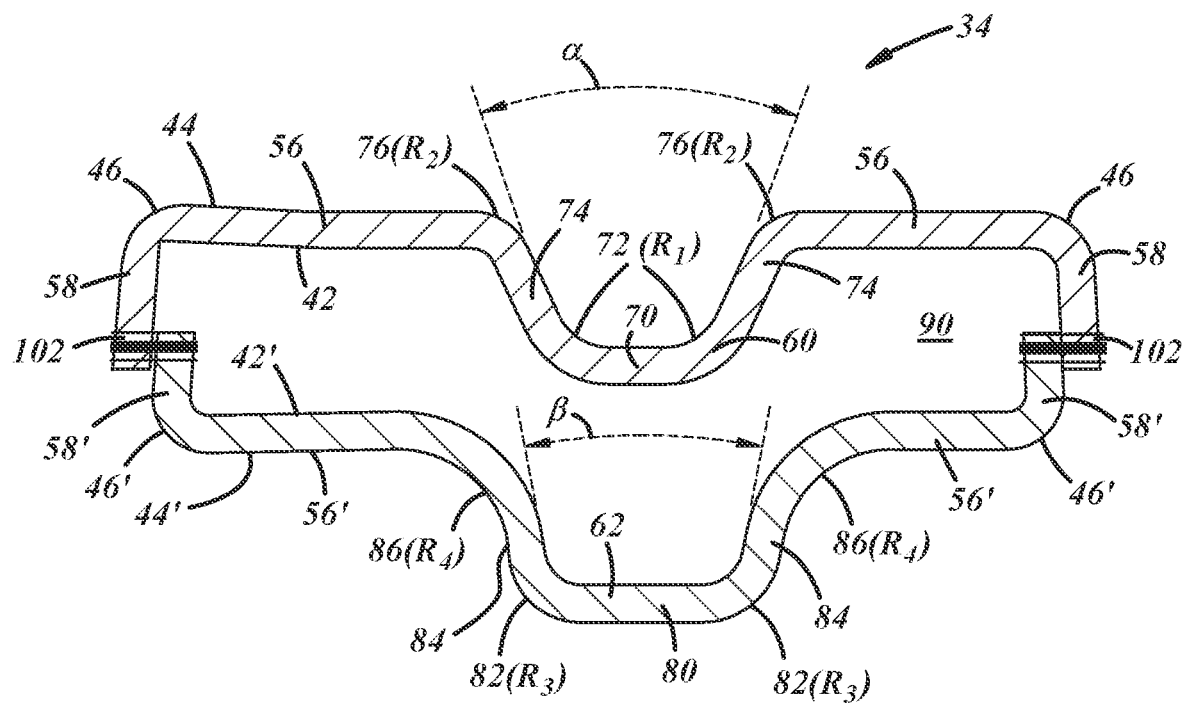
Figure 6:
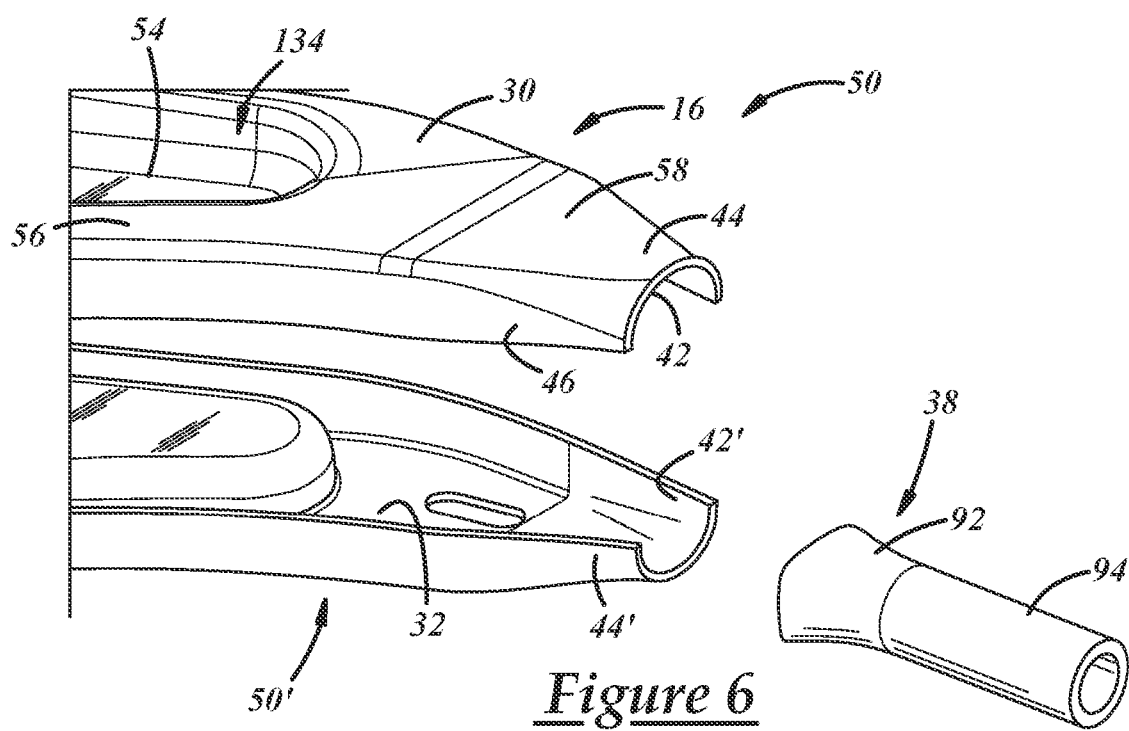
Figure 7:
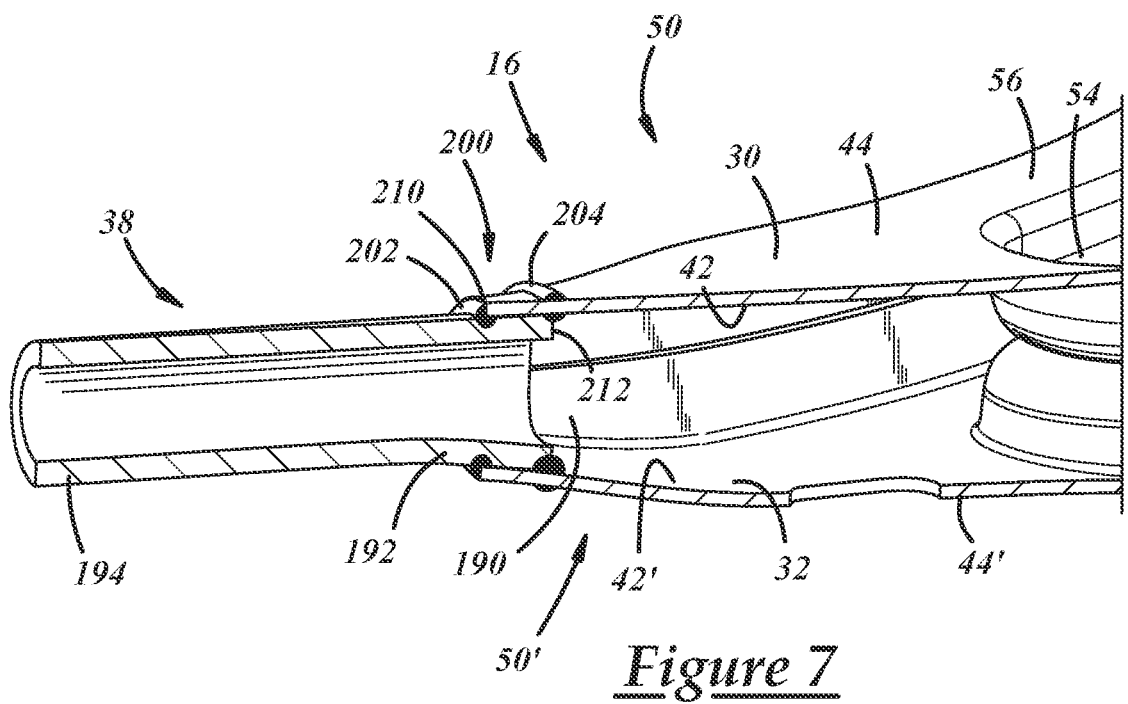
Figure 8:
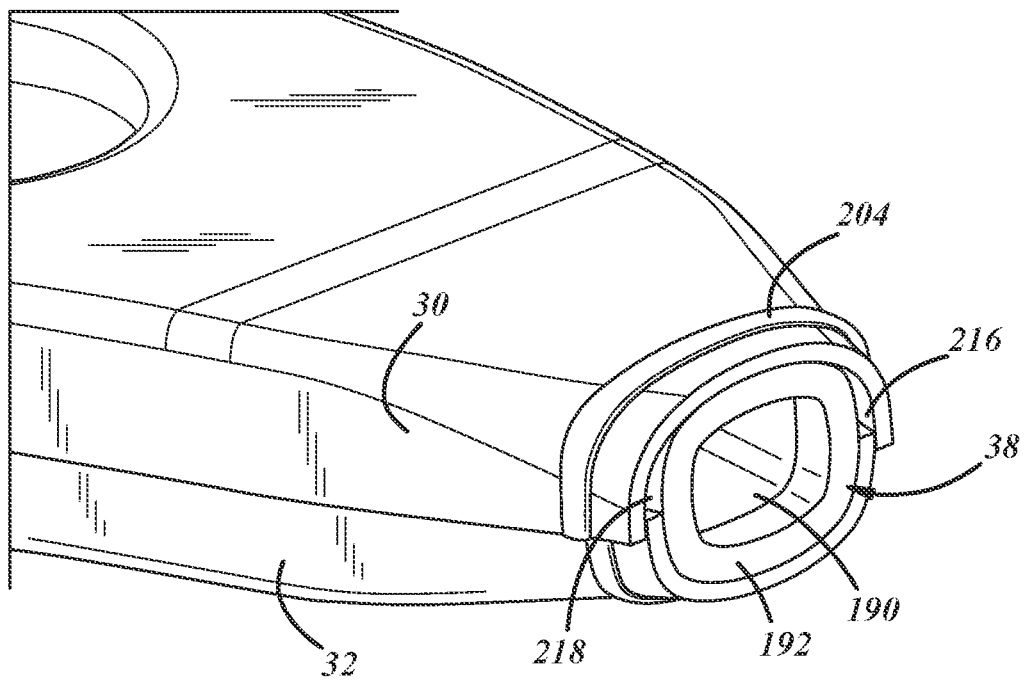

FIGS. 4A-C are sectional perspective views of the lower control arm of FIG. 2 taken along lines 4A-4C of FIG. 2, respectively, where the views show first and second stamped metal shells and the connection node for the ball joint after they are joined together;

FIG. 5 is a cross-sectional view of the lower control arm of FIG. 2 taken along line 4B of FIG. 2, where the view shows the different radii of the first and second stamped metal shells;

FIG. 6 is an exploded perspective view of the lower control arm of FIG. 2, where the view shows first and second stamped metal shells and a connection node for a bushing joint before they are joined together;

FIG. 7 is a sectional perspective view of the lower control arm of FIG. 2 taken along lines 7-7 of FIG. 2, where the view shows first and second stamped metal shells and the connection node for the bushing joint after they are joined together; and FIG. 8 is a sectional perspective view of the lower control arm of FIG. 2 taken along lines 8-8 of FIG. 2, where portions of the connection node for the bushing joint have been removed to better illustrate aspects of the welded connection.

DESCRIPTION

In an effort to reduce weight and increase the stiffness of vehicle components, new materials and methods of manufacture have been developed, especially for vehicle suspension components that are load bearing. Suspension components such as, but not limited to, control arms (e.g., upper control arms, lower control arms, and wishbone control arms) and linkages or joints (e.g., an attachment component for a knuckle, upright, axle or other link) are oftentimes located in load bearing positions of a suspension system and require a certain degree of stiffness and/or strength. Such suspension components may have one or more degrees of force acting on the component at any given point in time. Because suspension components may need to withstand both static and dynamic forces acting upon them, they are typically designed to be as stiff as possible. However, increasing the stiffness of a suspension component can correspondingly increase the weight of the component. Balancing stiffness requirements with the desire for a lightweight solution is effectively achieved with the vehicle suspension component described herein.

Figure 1:
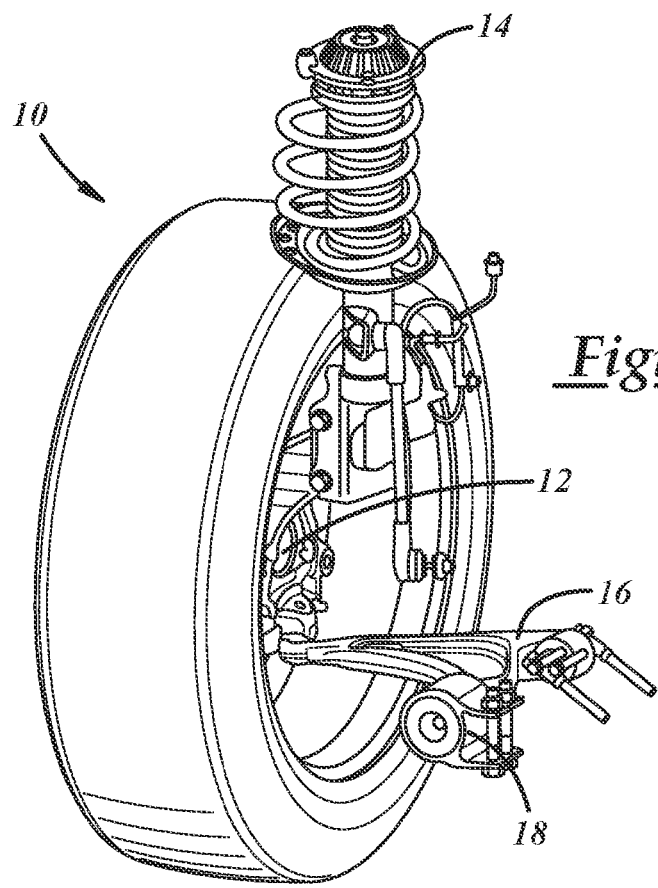
FIG. 1 is a partial perspective view of a vehicle corner having a wheel and several suspension components, including a lower control arm.

With reference to FIG. 1, a vehicle corner 10 is shown having a wheel 12, a suspension component in the form of a strut 14, and a suspension component in the form of a lower control arm 16. Although the suspension component of the present application is shown in this particular embodiment as a lower control arm 16, it should be appreciated that other suspension components, like upper control arms, wishbone control arms, linkages, joints, etc. could be used instead. Accordingly, the present application is not confined to a lower control arm, as that is merely one non-limiting example or embodiment of the present suspension component. Turning now to FIGS. 2-8, the lower control arm 16 is a multi-piece component that is arranged according to a clam shell or box-style type design and includes a first stamped metal shell 30, a second stamped metal shell 32, a strengthening feature 34, and connection nodes 36-40. The term "stamped," as used herein, broadly means all stamped, drawn, deep drawn or similarly formed metal parts and is not strictly limited to traditional stamping only.

The first stamped metal shell 30 makes up roughly half of the body of the lower control arm 16 (e.g., the upper half of the body in the example shown in the drawings). The metal shell 30 is preferably a stamped part, as opposed to a forged or cast part, and is made from a sheet metal material, such as a so-called next generation steel. The term "next generation steel," as used herein, broadly includes any steel having a yield strength, after forming, that is equal to or greater than 780 MPa along a load-bearing path and having an elongation, after forming, that is equal to or greater than 30%. Some non-limiting examples of next generation steels include, but are not limited to, advanced high-strength steels (AHSS), third generation steels (i.e., Gen3 steels), fourth generation steels (i.e., Gen4 steels), press hardenable or hot stamped steels, etc. The metal shell 30 may have any gauge or thickness suitable for the application in which it is being used, and it may have a uniform thickness or a variable thickness across the part prior to and/or after forming. According to one example, the metal shell 30 is stamped from next generation steel and has an average thickness of between 1.0 mm and 5.0 mm, inclusive; even more preferably, the metal shell 30 is stamped from next generation steel having an average thickness of between 1.5 mm and 4.0 mm, inclusive. The metal shell 30 has a shell interior surface 42, a shell exterior surface 44, a shell perimeter 46, and shell connection node portions 48-52 that receive connection nodes 36-40, respectively.

The shell interior and exterior surfaces 42, 44 are located on opposite interior and exterior sides of the first stamped metal shell 30, respectively, and are separated from one another by the thickness of the part. The shell perimeter 46 generally follows the outside or periphery of the part and creates a shell rim 56 that somewhat resembles a raised plateau-like surface and at least partially surrounds a shell depression or recess 54 formed towards the center of the part, where the shell depression includes a depression floor 64 and a depression weld 66. The depression weld 66 joins the shell interior surfaces 42, 42' of the first and second stamped metal shells 30, 32 together and may be a laser weld or any other suitable type of weld. The height and/or width of the shell rim 56 may be uniform or may vary, depending on the particular needs and requirements of the application, and helps define the shape of the shell recess 54.

The shell connection node portions 48, 50, and 52 are areas of the metal shell 30 where the part securely attaches to connection nodes 36, 38, and 40, respectively. Each of the shell connection node portions 48, 50, and 52 is designed to work with a complementary connection node portion 48', 50', and 52' that is part of the second stamped metal shell 32. For instance, shell connection node portions 48 and 48' of the first and second stamped metal shells 30 and 32 are sandwiched around and welded to an attachment end of connection node 36, which is part of a ball joint, so that the two shells and the connection node can be securely joined together (best shown in FIGS. 4A-C). The ball joint, in turn, operably connects the lower control arm 16 to the rest of the vehicle suspension system, as is understood by those skilled in the art. Another example of connection node portions 50, 50' sandwiched around and welded to a corresponding connection node, this time in the form of a bushing joint connection node 38, is shown in FIGS. 6-8, which will be discussed later. The portion of lower control arm 16 that includes shell connection node portions 48 and 48' may be referred to as the "ball joint zone," whereas the portion that includes shell connection node portions 50, 50' may be referred to as the "bushing joint zone." The other shell connection node portions 52, 52' (not shown) are connected to connection node 40, which may be part of a separate bushing assembly. Lower control arm 16 is representative of a three-point control arm. However, it should be appreciated that the present suspension component may have more or less connection nodes than shown here, it may have different types of connection nodes than shown here, or it may have a different arrangement altogether in terms of connection nodes, as these are merely examples.

The second stamped metal shell 32, having interior and exterior surfaces 42' and 44', is similar and complementary to the first stamped metal shell 30 so that the two metal shells can be joined together to form a clam-shell box-style type design. Unless specified, the second stamped metal shell 32 can be assumed to have the same parts, features, materials, characteristics, etc. as described above in conjunction with the first stamped metal shell 30 (equivalent features are usually identified with the same number, except the reference numerals are primed). Thus, a full, duplicative description of the second stamped metal shell has been omitted in favor of the description above, which applies here as well. In the embodiment shown in the drawings, the first and second stamped metal shells 30, 32 are largely mirror images of one another. The lower control arm 16 is not limited, however, to such a configuration.

The strengthening feature 34 is located in a high load or high stress region of the lower control arm 16 (e.g., near one of the connection nodes 36, 38, 40) and may include elements or features from the first stamped metal shell 30, the second stamped metal shell 32, or both the first and second stamped metal shells 30, 32 so that the lower control arm is strengthened in that area. According to one example, the strengthening feature 34 is located near the ball joint connection node 36 and includes a strengthening indentation 60 formed in metal shell 30 and a corresponding strengthening protrusion 62 formed in metal shell 32 (of course this may be reversed such that 60 is formed in metal shell 32 and 62 is formed in metal shell 32), where the formations 60 and 62 engage a complementarily shaped attachment end of connection node 36 and are welded thereto. The size and shape of the strengthening feature 34 may vary along its length, as demonstrated in FIGS. 4A-C, where different sectional views are shown at different locations along the length of the feature. For instance, starting in FIG. 4A where a sectional view is taken at a position closest to the ball joint connection node 36, the width $W_1$ of the strengthening indentation 60 is smaller than a width $W_2$ in FIG. 4B, which in turn is smaller than a width $W_3$ in FIG. 4C. As one moves along the length of the strengthening feature 34 and progresses from FIG. 4A to 4C, the width of the indentation 60 may increase from the smallest width $W_1$ to the largest width $W_3$. Similarly, the depth of the indentation 60 can increase as one progresses from the position in FIG. 4A to that of FIG. 4C such that depth $D_1$ is the smallest and $D_3$ is the largest. This type of gradual or tapered change in width and/or depth is not necessary, but may be useful for achieving the required stiffness and/or strength for the particular application, as well as making the component more manufacturable.

Turning now to FIG. 5, the strengthening indentation 60 and protrusion 62 are discussed in more detail. In cross-section, the indentation 60 may be a U-shaped trough or channel that is formed in metal shell 30 or 32 and may include an indentation floor 70, a pair of indentation inner edges 72, a pair of indentation side walls 74, and a pair of indentation outer edges 76. As its name suggests, the indentation floor 70 is located at the bottom of the strengthening indentation 60 and is a relatively narrow and flat section of the feature that may extend from the shell connection node portion 48 to the shell recess 54. The indentation floor 70 is bounded on both sides by the pair of indentation inner edges 72, which appear as somewhat rounded corners and are defined by a radius $R^1$. The indentation side walls 74 extend upwardly and outwardly from the indentation inner edges 72 such that they form an indentation angle α. The indentation side walls 74 terminate at the pair of indentation outer edges 76, which may be slightly more squared-off than edges 72 and are defined by a radius R2. Radius $R_2$ may be greater than radius $R_1$ so that the indentation inner edges 72 are tighter than the indentation outer edges 76, and the indentation side walls 74 may diverge outwardly so that the width of indentation 60 is greater at the outer edges 76 (i.e., at the top of the indentation) than at the inner edges 72 (i.e., at the bottom of the indentation). According to one non-limiting example, radius $R_1$ may be between 1 mm and 10 mm, inclusive, radius $R_2$ may be between 2 mm and 11 mm, inclusive, and indentation angle α may be an acute angle between 0° and 60°, inclusive. Of course, the preceding ranges are only examples and are not mandatory. Indentation edges 76 then turn outwardly and blend into the shell rim 56 which has flat surfaces that can be parallel with indentation floor 70 and can extend outwardly towards the shell perimeter 46. Out at the shell perimeter 46, the metal shell 30 is bent downwardly so that a pair of shell side walls 58 extend from the shell rim 56 and can be joined to corresponding side walls 58' of the second stamped metal shell 32. For example, the shell side walls 58, 58' may be welded together along a weld 102 in a box-style formation. In a different example, a flanged clam-shell type style may be used (i.e., where the overlapping edges are further bent so that they are horizontally aligned with one another, as opposed to being vertically aligned, as in the orientation of FIG. 5) or other means of connecting the first metal sheet and second metal sheet may also be used (e.g., hemming or riveting).

As already stated, many of the features of second stamped metal shell 32 correspond to those of the first stamped metal shell 30 described above. Thus, a full description of features 42', 44', 46', 48', 54', 56' and 58' has been omitted in favor of the description above. The strengthening protrusion 62 is complementary in shape to the strengthening indentation 60 and, as such, may include a protrusion ceiling 80, protrusion inner edges 82, protrusion side walls 84, and protrusion outer edges 86. The protrusion ceiling 80 is a generally flat surface bounded by the pair of protrusion inner edges 82, which can be defined by a radius $R_3$. The protrusion side walls 84 extend from the inner edges 82 towards the outer edges 86 according to a protrusion angle β, from which the outer edges 86 blend into the surrounding surfaces of the shell rim 56'. The protrusion outer edges 86 can be defined by a radius $R_4$. According to one possibility, radius $R_4$ may be greater than radius $R_3$ so that the inner edges 82 are tighter than the outer edges 86, and the protrusion side walls 84 may diverge outwardly so that the width of the strengthening protrusion 62 is greater at the outer edges 86 than at the inner edges 82. According to a non-limiting example, radius $R_3$ may be between 2 mm and 11 mm, inclusive, radius $R_4$ may be between 11 mm and 10 mm, inclusive, and protrusion angle β may be an acute angle between 0° and 60°, inclusive. In the example of FIG. 5, the indentation angle α is equal to or greater than the protrusion angle β. It should be appreciated that the aforementioned ranges and values are just examples and the present suspension component is not limited to such. For instance, if an application requires a higher load bearing capacity, indentation angle α, protrusion angle β, or both angles could be reduced so that the corresponding sidewalls are as steep as possible, which will typically have the effect of strengthening that region.

Interior cavity 90 is formed between the interior surfaces 42 and 42' of the first and second stamped metal shells 30 and 32, respectively, and is shaped so that a fixed attachment end 92 of connection node 36 can fit within the interior cavity. As best illustrated in FIGS. 4A-4C, the cross-sectional shape of the fixed attachment end 92 tightly corresponds to that of the interior cavity 90 so that the first and second stamped metal shells 30, 32 can be welded or otherwise securely attached to the connection 36, such as by a weld 100 that at least partially surrounds the attachment end 92. Weld 100 can be a laser weld or some other suitable weld; it can be continuous so that it completely encircles or circumscribes the attachment end 92 or it can be non-continuous or broken into weld segments; it can be a single weld or it can include multiple welds produced by multiple weld passes; and it can be located slightly inboard from the edge of the metal shells (as illustrated in FIGS. 4A-4C) or it can be right at the edge of the metal shells so that the weld straddles the metal shells 30, 32 and the connection node 36, to cite a few possibilities. Other weld embodiments and arrangements are certainly possible.

Connection node 36 is a separate, solid piece that is securely attached to the first and second stamped metal shells 30, 32 and is designed to operably connect the suspension component 16 with the rest of the vehicle suspension system. In this particular example, connection node 36 is a ball joint connection node that cooperates with the rest of a lower ball joint assembly located in the wheel 12 so that the lower control arm 16 can pivot or otherwise move when the vehicle encounters bumps and undulations in the road. Connection node 36 is preferably made of forged steel or some other high-strength material and includes a fixed attachment end 92 and a movable attachment end 94. In other embodiments, the connection node 36 could be made of cast steel or some other high-strength material, as opposed to forged steel. The fixed attachment end 92 fits within interior cavity 90 and is welded to metal shells 30, 32 so that it is fixed in place, as previously explained. The movable attachment end 94, on the other hand, includes a socket that is part of the lower ball joint assembly and is designed to pivotably receive a ball stud or similar component (not shown). It should be recognized that while connection node 36 has been described in the context of a ball joint connection node for a lower ball joint assembly, this is not necessary, as other embodiments and implementations are certainly possible. For example, connection node 36 could be provided in the context of pin and bushing arrangement of connection nodes 38 or 40 instead.

Turning now to FIGS. 6-8, there is shown an example of shell connection node portions 50 and 50' of the first and second stamped metal shells 30 and 32 that are sandwiched around and welded to connection node 38, which is part of a bushing joint, so that the two shells and the connection node can be securely joined together. The bushing joint, in turn, operably connects the lower control arm 16 to the rest of the vehicle suspension system, as is understood by those skilled in the art. The portion of the lower control arm 16 that includes shell connection node portions 50 and 50' may be referred to as the "bushing joint zone." The other shell connection node portions 48 and 52 are connected to connection nodes 38 and 40, respectively, which may be part of ball joint or other assemblies. Lower control arm 16 is representative of a three-point control arm. However, it should be appreciated that the present suspension component may have more or less connection nodes than shown here, it may have different types of connection nodes than shown here, or it may have a different arrangement altogether in terms of connection nodes, as these are merely examples.

The strengthening feature 134 may be located in a high load or high stress region of the lower control arm 16 and may include elements or features from the first stamped metal shell 30, the second stamped metal shell 32, or both the first and second stamped metal shells 30, 32 so that the lower control arm is strengthened in that area. According to one example, the strengthening feature 134 is an indentation in the part that extends out towards, but does not reach, the shell connection node portions 50 and 50' and includes the shell recess 54 and the shell rim 56, as previously described. To increase the effectiveness of the strengthening feature 134, the first and second stamped metal shells 30 and 32 may be welded or otherwise joined together in the area of the shell recess 54. The size and shape of the strengthening feature 134 may vary along its length.

FIGS. 7 and 8 are sectional perspective views of the control arm 16 in the vicinity of the bushing joint zone where the bushing joint connection node 38 is sandwiched between and welded to the first and second stamped metal shells 30, 32. When the first and second stamped metal shells 30, 32 are brought together, an interior cavity 190 is formed between the interior surfaces 42 and 42' and is shaped so that a fixed attachment end 192 of connection node 38 can fit within the interior cavity. The cross-sectional shape of the fixed attachment end 192 tightly corresponds to that of the interior cavity 190 so that the first and second stamped metal shells 30, 32 can contact and be welded to the connection node 38, such as by a weld 200 that at least partially surrounds the attachment end 192. Weld 200 can be a laser weld or some other suitable weld; it can be continuous so that it completely encircles or circumscribes the attachment end 192 or it can be non-continuous or broken into weld segments; it can be a single weld or it can include multiple welds produced by multiple weld passes; and it can be located slightly inboard from the edge of the metal shells or it can be right at the edge of the metal shells so that the weld straddles the metal shells 30, 32 and the connection node 38, to cite a few possibilities. Other weld embodiments and arrangements are certainly possible.

In the example of FIGS. 7 and 8, the bushing joint connection node 38 is secured to the first and second stamped metal shells 30, 32 by way of a weld 200 that includes first and second circumferential welds 202, 204 (only the second weld 204 can be seen in FIG. 8 due to the location of the cutaway). The first circumferential weld 202 is located at the end or edge 210 of each metal shell, which creates a stepped or non-flush junction with a side surface of the connection node 38, so that the weld 202 can span both the metal shell and the connection node 38. The second circumferential weld 204, which is slightly inboard of the first circumferential weld 202, is located at the end or edge 212 of the connection node 38, which forms a stepped or non-flush junction with the interior surfaces 42, 42' of the first and second stamped metal shells 30, 32, respectively. The connection node 38 is fitted within the first and second stamped metal shells 30, 32 in a fixed telescoping-like fashion. In one example, the first and second circumferential welds 202, 204 are laser welds that penetrate through the metal shells 30, 32 so as to melt portions of the underlying connection node 38; thus, each of the welds 202, 204 may include material from both a stamped metal shell and the connection node. Circumferential welds 202, 204 may be unbroken welds that surround the fixed attachment end 192 of the spindle-like connection node 38; for instance, welds 202, 204 may completely surround the connection node 38, including at areas such as gaps 216, 218 where the first and second stamped metal shells 30, 32 come together at a stepped or uneven junction (see FIG. 8). As illustrated, circumferential welds 202, 204 are generally parallel to and spaced from one another. Other types of welds and weld arrangements, including those with a different number of welds or different types of welds, are certainly possible.

Connection node 38 is a separate piece that is securely attached to the first and second stamped metal shells 30, 32 and is designed to operably connect the suspension component 16 with the rest of the vehicle suspension system. In this particular example, connection node 38 is a hollow pin or spindle that cooperates with the rest of a bushing joint assembly located on the vehicle chassis so that the lower control arm 16 can pivot or otherwise move when the vehicle encounters bumps and undulations in the road. Connection node 38 is preferably made of forged steel or some other high-strength material and includes a fixed attachment end 192 and a movable attachment end 194. In other embodiments, the connection node 38 could be cast, machined, hydroformed, or otherwise formed from some high-strength material, as opposed to forged steel. The fixed attachment end 192 flares out or is tapered outwardly so as to have a larger outer dimension than that of the movable attachment end 194. The fixed attachment end 192 fits within interior cavity 190 and is welded to the inside of metal shells 30, 32 (i.e., interior surfaces 42, 42'), which are arranged in a clamshell or box-style type configuration, as previously explained. The movable attachment end 194, on the other hand, is a smooth cylindrical shaped pin or spindle that is designed to be received within a cylindrical bushing 18 or similar component (see FIG. 1). It should be recognized that while connection node 38 has been described in the context of a bushing joint connection node for a bushing joint assembly, this is not necessary, as other embodiments and implementations are certainly possible. For example, connection node 38 could be provided in the context of a ball joint or other arrangement instead.

It is to be understood that the foregoing description is not a definition of the invention, but is a description of one or more exemplary illustrations of the invention. The invention is not limited to the particular example(s) disclosed herein, but rather is defined solely by the claims below. Furthermore, the statements contained in the foregoing description relate to particular exemplary illustrations and are not to be construed as limitations on the scope of the invention or on the definition of terms used in the claims, except where a term or phrase is expressly defined above. Various other examples and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle suspension component, comprising:
a first stamped metal shell that includes a shell interior surface, a shell exterior surface, and a shell connection node portion;
a second stamped metal shell that includes a shell interior surface, a shell exterior surface, and a shell connection node portion, at least one of the first or second stamped metal shells includes a strengthening feature located at or near one of the shell connection node portions, the strengthening feature includes a strengthening indentation, a strengthening protrusion, or both a strengthening indentation and protrusion; and a connection node for connecting the vehicle suspension component to a part of a vehicle suspension system, the connection node includes a fixed attachment end and a movable attachment end, wherein the shell connection node portions of the first and second stamped metal shells at least partially surround and are attached to the fixed attachment end of the connection node;

wherein the connection node is a bushing joint connection node that is a separate piece from the first and second stamped metal shells and is in the shape of a spindle, the bushing joint connection node includes the fixed attachment end for fixed attachment to the first and second stamped metal shells, and the movable attachment end for movable or rotatable attachment within a bushing joint assembly of a vehicle suspension system;

the fixed attachment end of the bushing joint connection node is flared and is received in an interior cavity formed between the first and second stamped metal shells, and the fixed attachment end is welded to the first and second stamped metal shells with at least one circumferential weld.

2. The vehicle suspension component of claim 1, wherein at least one of the first or second stamped metal shells is made from a next generation steel that has a yield strength, after forming, that is equal to or greater than 780 MPa along a load-bearing path and has an elongation, after forming, that is equal to or greater than 30%.

3. The vehicle suspension component of claim 2, wherein the at least one stamped metal shell has an average thickness of between 1.0 mm and 5.0 mm and is made from a next generation steel that is selected from the group consisting of: advanced high-strength steels (AHSS), third generation steels (Gen3 steels), fourth generation steels (Gen4 steels), or press hardenable or hot stamped steels.

4. The vehicle suspension component of claim 1, wherein the first and second stamped metal shells are complementary in shape and form a clam-shell or a box design, and a plurality of connection nodes including the bushing joint connection node are sandwiched between the first and second stamped metal shells.

5. The vehicle suspension component of claim 1, wherein the strengthening feature includes a strengthening indentation that is a U-shaped trough or channel with an indentation floor located at a bottom of the strengthening indentation, a pair of indentation inner edges that are connected to the indentation floor, a pair of indentation side walls that are connected to and extend from the pair of indentation inner edges, and a pair of indentation outer edges that are connected to the pair of indentation side walls.

6. The vehicle suspension component of claim 5, wherein each of the pair of indentation inner edges is a rounded corner and is defined by a radius $R_1$, and each of the pair of indentation outer edges is a rounded corner and is defined by a radius $R_2$.

7. The vehicle suspension component of claim 6, wherein the radius $R_1$ is between 1 mm and 10 mm, inclusive, the radius $R_2$ is between 2 mm and 11 mm, inclusive, and the radius $R_2$ is greater than the radius $R_1$ so that the pair of indentation inner edges are tighter than the pair of indentation outer edges.

8. The vehicle suspension component of claim 5, wherein the pair of indentation side walls extend from the pair of indentation inner edges and diverge outwardly at an indentation angle $\alpha$ such that a width (W) of the strengthening indentation is greater at the indentation outer edges than at the indentation inner edges.

9. The vehicle suspension component of claim 5, wherein a width (W) and a depth (D) of the strengthening feature vary along a length of the strengthening feature such that a first width ($W_1$) of the strengthening feature is smaller than a second width ($W_2$) of the strengthening feature when the first width is at a position closer to one of a plurality of connection nodes than the second width, and a first depth ($D_1$) of the strengthening feature is smaller than a second depth ($D_2$) of the strengthening feature when the first depth is at a position closer to the one of a plurality of connection nodes than the second depth, the plurality of connection nodes includes the bushing joint connection node.

10. The vehicle suspension component of claim 1, wherein at least one of the first or second stamped metal shells includes a shell depression that is formed towards a center of the vehicle suspension component and includes a depression floor and a depression weld that is at least partially located in the depression floor, wherein the depression weld joins the shell interior surfaces of the first and second stamped metal shells together.

11. The vehicle suspension component of claim 1, wherein the cross-sectional shape of a fixed attachment end of one of a plurality of connection nodes tightly corresponds to that of an interior cavity so that the first and second stamped metal shells are welded to the fixed attachment end of the one of a plurality of connection nodes with a weld, the plurality of connection nodes includes the bushing joint connection node.

12. The vehicle suspension component of claim 1, wherein one of a plurality of connection nodes is a ball joint connection node that is a separate piece from the first and second stamped metal shells and is made of a solid metal, the ball joint connection node includes a fixed attachment end for fixed attachment to the first and second stamped metal shells, and a movable attachment end for movable or pivotable attachment within a ball joint assembly of a vehicle suspension system, the plurality of connection nodes includes the bushing joint connection node and the ball joint connection node.

13. The vehicle suspension component of claim 1, wherein the at least one circumferential weld includes first and second circumferential laser welds that are parallel to one another and circumferentially surround the fixed attachment end of the bushing joint connection node.

14. The vehicle suspension component of claim 1, wherein the vehicle suspension component is a three-point lower control arm that includes a ball joint connection node for attachment to a ball joint, a first bushing joint connection node for attachment to a first bushing joint, and a second bushing joint connection node for attachment to a second bushing joint.

15. A vehicle suspension component, comprising:
a first stamped metal shell that includes a shell interior surface, a shell exterior surface, and a shell connection node portion;
a second stamped metal shell that includes a shell interior surface, a shell exterior surface, and a shell connection node portion, at least one of the first or second stamped metal shells includes a strengthening feature located at or near one of the shell connection node portions, the strengthening feature includes a strengthening indentation, a strengthening protrusion, or both a strengthening indentation and protrusion; and a connection node for connecting the vehicle suspension component to a part of a vehicle suspension system, the connection node includes a fixed attachment end and a movable attachment end, wherein the shell connection node portions of the first and second stamped metal shells at least partially surround and are attached to the fixed attachment end of the connection node;

wherein the connection node is a bushing joint connection node that is a separate piece from the first and second stamped metal shells and is in the shape of a spindle, the bushing joint connection node includes the fixed attachment end for fixed attachment to the first and second stamped metal shells, and the movable attachment end for movable or rotatable attachment within a bushing joint assembly of a vehicle suspension system;

the fixed attachment end of the bushing joint connection node is flared and is received in an interior cavity formed between the first and second stamped metal shells, and the fixed attachment end is welded to the first and second stamped metal shells with at least one circumferential weld;

the at least one circumferential weld includes first and second circumferential laser welds that are parallel to one another and circumferentially surround the fixed attachment end of the bushing joint connection node;

the first circumferential laser weld is located at an end of the first and second stamped metal shells so as to create a stepped or non-flush junction with a side surface of the bushing joint connection node, and the second circumferential laser weld is located inboard of the first circumferential laser weld at an end of the bushing joint connection node so as to create a stepped or non-flush junction with the interior surfaces of the first and second stamped metal shells, respectively.

16. A method for manufacturing a vehicle suspension component, the method comprising the steps of:

stamping a first stamped metal shell that includes a shell interior surface, a shell exterior surface, and a shell connection node portion;

stamping a second stamped metal shell that includes a shell interior surface, a shell exterior surface, and a shell connection node portion, at least one of the first or second stamped metal shells includes a strengthening feature located at or near one of the shell connection node portions, the strengthening feature includes a strengthening indentation, a strengthening protrusion, or both a strengthening indentation and protrusion;

providing a connection node for connecting the vehicle suspension component to a part of a vehicle suspension system, the connection node includes a fixed attachment end and a movable attachment end, the connection node is a bushing joint connection node that is a separate piece from the first and second stamped metal shells and is in the shape of a spindle, the fixed attachment end is for fixed attachment to the first and second stamped metal shells, and the movable attachment end is for movable or rotatable attachment within a bushing joint assembly of a vehicle suspension system;

positioning the shell connection node portions of the first and second stamped metal shells to be at least partially surrounding the fixed attachment end of the bushing joint connection node, the fixed attachment end of the bushing joint connection node is flared and is received in an interior cavity formed between the first and second stamped metal shells; and welding the shell connection node portions of the first and second stamped metal shells to the fixed attachment end of the bushing joint connection node with at least one circumferential weld.

\* \* \* \* \*